(12) United States Patent
Parks

(10) Patent No.: US 12,353,460 B2
(45) Date of Patent: Jul. 8, 2025

(54) 1000 MORE SYSTEM FOR POLITICAL ENGAGEMENT

(71) Applicant: D'Seante Parks, Wilmington, DE (US)

(72) Inventor: D'Seante Parks, Wilmington, DE (US)

( * ) Notice: Subject to any disclaimer, the term of this patent is extended or adjusted under 35 U.S.C. 154(b) by 100 days.

(21) Appl. No.: 18/081,131

(22) Filed: Dec. 14, 2022

(65) Prior Publication Data

US 2024/0202222 A1    Jun. 20, 2024

(51) Int. Cl.
| | |
|---|---|
| *G06F 16/335* | (2019.01) |
| *G06F 16/34* | (2025.01) |
| *G06F 16/387* | (2019.01) |
| *G07C 13/00* | (2006.01) |

(52) U.S. Cl.
CPC .......... *G06F 16/337* (2019.01); *G06F 16/345* (2019.01); *G06F 16/387* (2019.01); *G07C 13/00* (2013.01)

(58) Field of Classification Search
None
See application file for complete search history.

(56) References Cited

U.S. PATENT DOCUMENTS

| | | | |
|---|---|---|---|
| 4,930,077 | A | 5/1990 | Fan |
| 7,412,463 | B2 | 8/2008 | Mitchell et al. |
| 7,657,493 | B2 | 2/2010 | Meijer et al. |
| 7,716,225 | B1 | 5/2010 | Dean et al. |
| 8,006,894 | B1 | 8/2011 | Rouverol |
| 8,019,755 | B2 | 9/2011 | Hillary et al. |
| 8,171,038 | B2 | 5/2012 | Tomicki et al. |
| 8,438,122 | B1 | 5/2013 | Mann et al. |
| 8,671,098 | B2 | 3/2014 | Salvetti et al. |
| 8,818,788 | B1 | 8/2014 | Mihalik et al. |
| 9,436,726 | B2 | 9/2016 | Matthews |
| 10,817,566 | B2 | 10/2020 | Powell et al. |
| 2002/0107698 | A1 | 8/2002 | Brown et al. |
| 2004/0060983 | A1 | 4/2004 | Davis et al. |
| 2009/0193056 | A1 | 7/2009 | Tomicki et al. |

(Continued)

FOREIGN PATENT DOCUMENTS

| | | |
|---|---|---|
| AU | 2003267974 B2 | 1/2004 |
| WO | 2015048275 A2 | 4/2015 |

*Primary Examiner* — Taelor Kim
(74) *Attorney, Agent, or Firm* — Crowe & Dunlevy LLC; Jeremy B. Berman

(57) ABSTRACT

1000 MORE is a digital political marketplace that centralizes all civic engagement for constituents, advocacy organizations and elected officials. It generates information about bills coming up for a vote, elected officials, and advocacy efforts, then provides action options including calls, emails, connecting via social media and crowdfunding. 1000 MORE provides constituent users with information about how their elected officials and candidates align with their interests based on their usage of the platform. With that information in hand, constituents can engage with candidates through phone, email, social media or donations. Furthermore, 1000 MORE uses that information to build a hyper personalized voter guide for constituents. It also gamifies civic engagement with a scoring system and options to connect with other users. Advocacy organizations have an interface where they can connect with constituents and crowdfund. Elected officials have an interface where they can track the preferences of and communicate with their constituency.

6 Claims, 15 Drawing Sheets

(56) References Cited

U.S. PATENT DOCUMENTS

| | | |
|---|---|---|
| 2009/0319342 A1 | 12/2009 | Shilman et al. |
| 2010/0185641 A1* | 7/2010 | Brazier ................. G06Q 50/26 |
| | | 707/758 |
| 2013/0110738 A1* | 5/2013 | McHorris .............. G06Q 10/06 |
| | | 705/329 |
| 2013/0173354 A1 | 7/2013 | Strausfeld et al. |
| 2013/0179237 A1* | 7/2013 | Hull ....................... H04L 51/52 |
| | | 709/206 |
| 2014/0067970 A1 | 3/2014 | Sharma |
| 2015/0106170 A1 | 4/2015 | Bonica |
| 2015/0112772 A1 | 4/2015 | Bonica et al. |
| 2015/0206265 A1 | 7/2015 | Tupa |
| 2015/0287147 A1 | 10/2015 | Silman |
| 2016/0232544 A1 | 8/2016 | Scotson |
| 2017/0132380 A1 | 5/2017 | Appel et al. |
| 2017/0308795 A1 | 10/2017 | Grom et al. |
| 2017/0308797 A1 | 10/2017 | Palombi et al. |
| 2017/0308976 A1 | 10/2017 | Eidelman et al. |
| 2018/0285892 A1 | 10/2018 | Brooks et al. |
| 2019/0020471 A1* | 1/2019 | Santilli ................... H04L 9/006 |
| 2022/0141159 A1* | 5/2022 | Eidelman ............... G06N 20/20 |
| | | 709/206 |

* cited by examiner

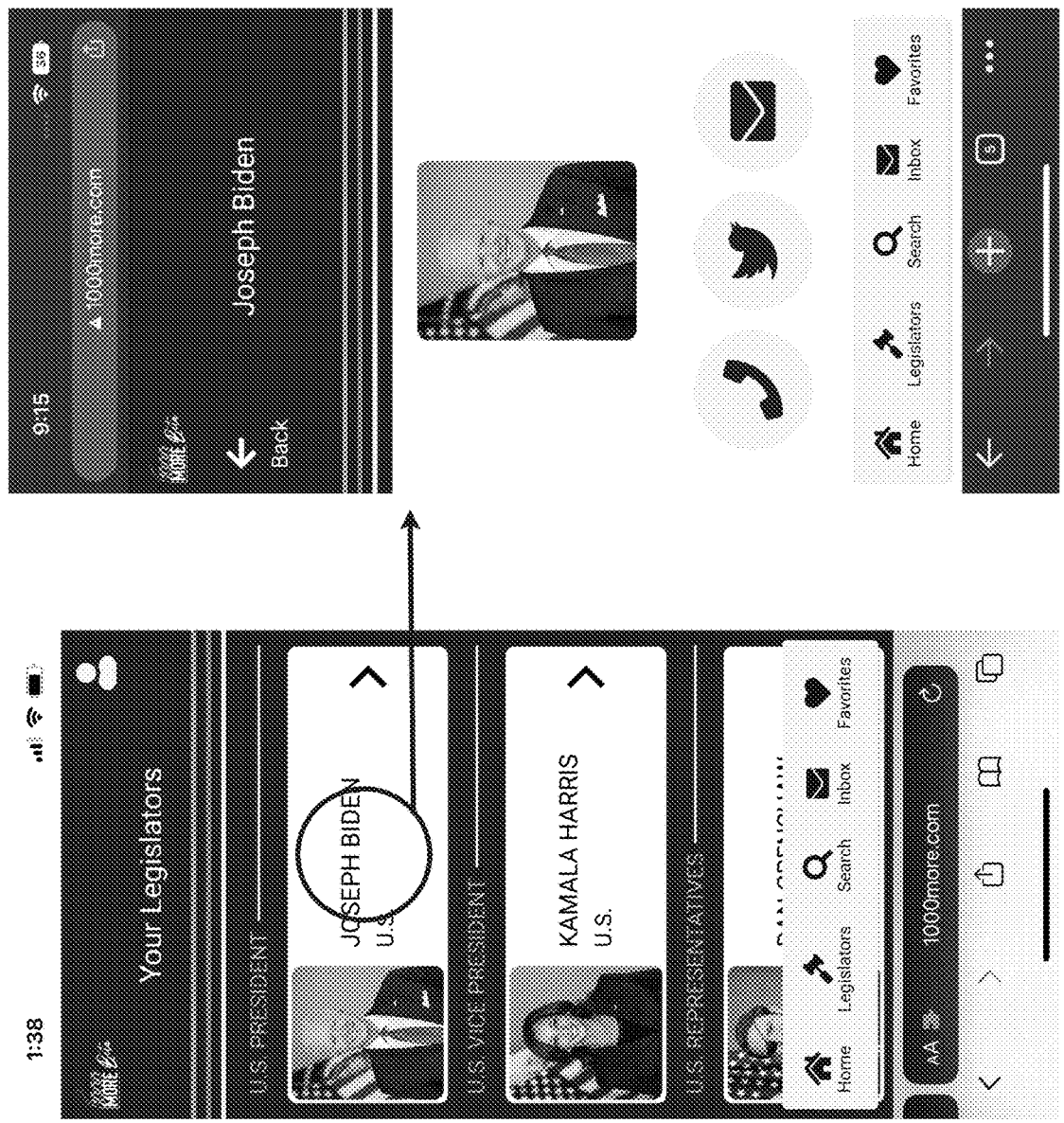

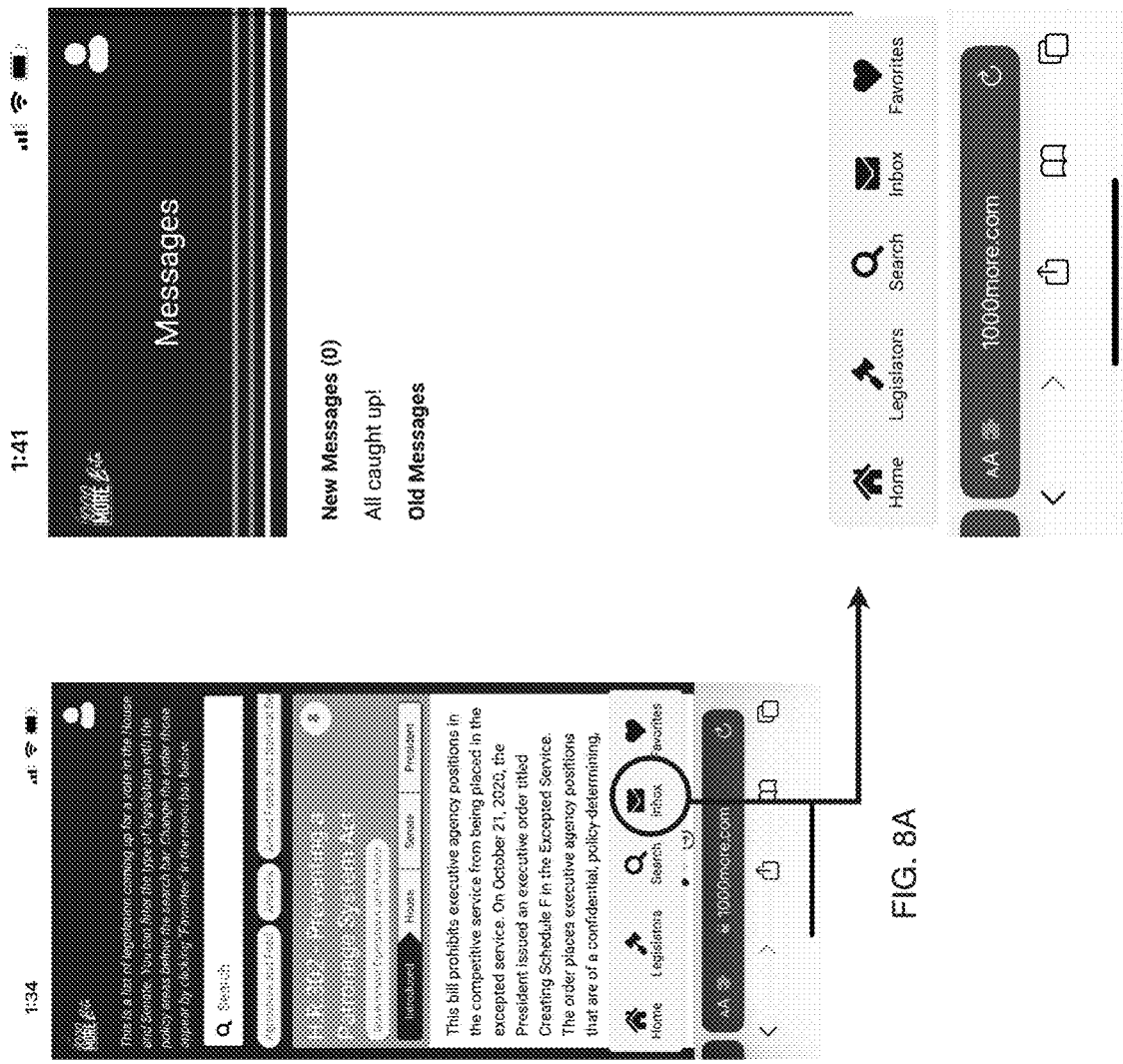

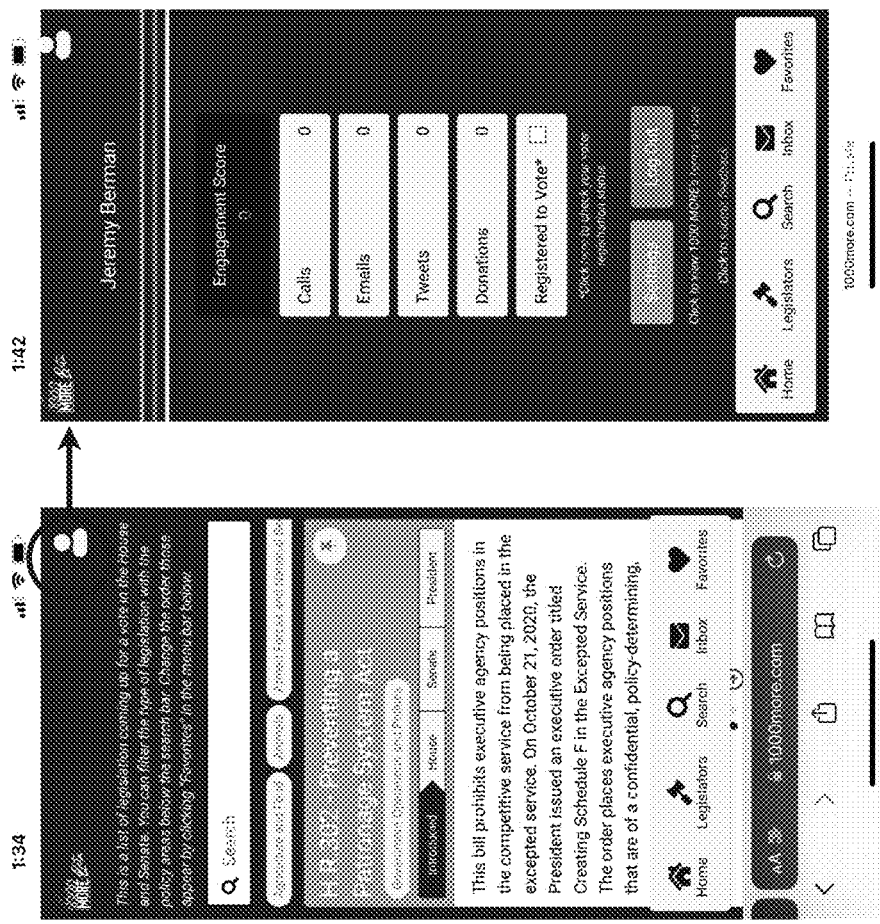

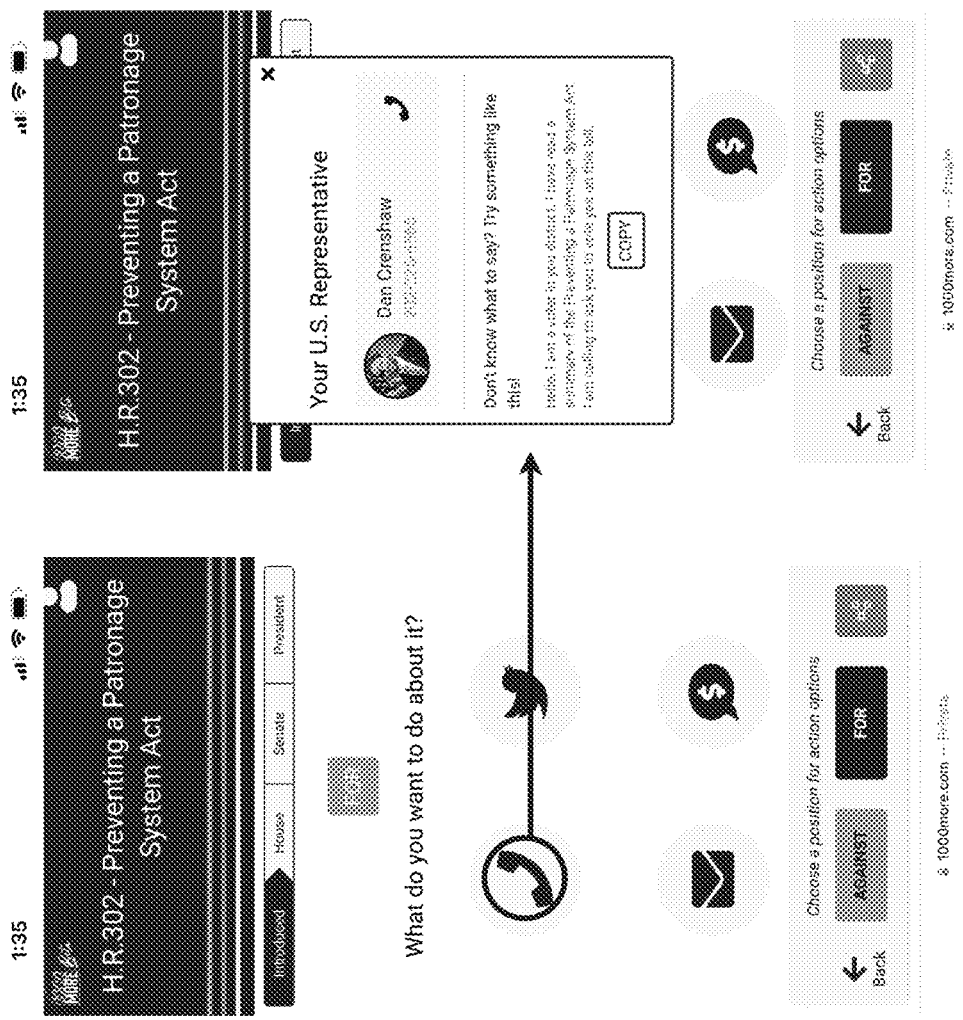

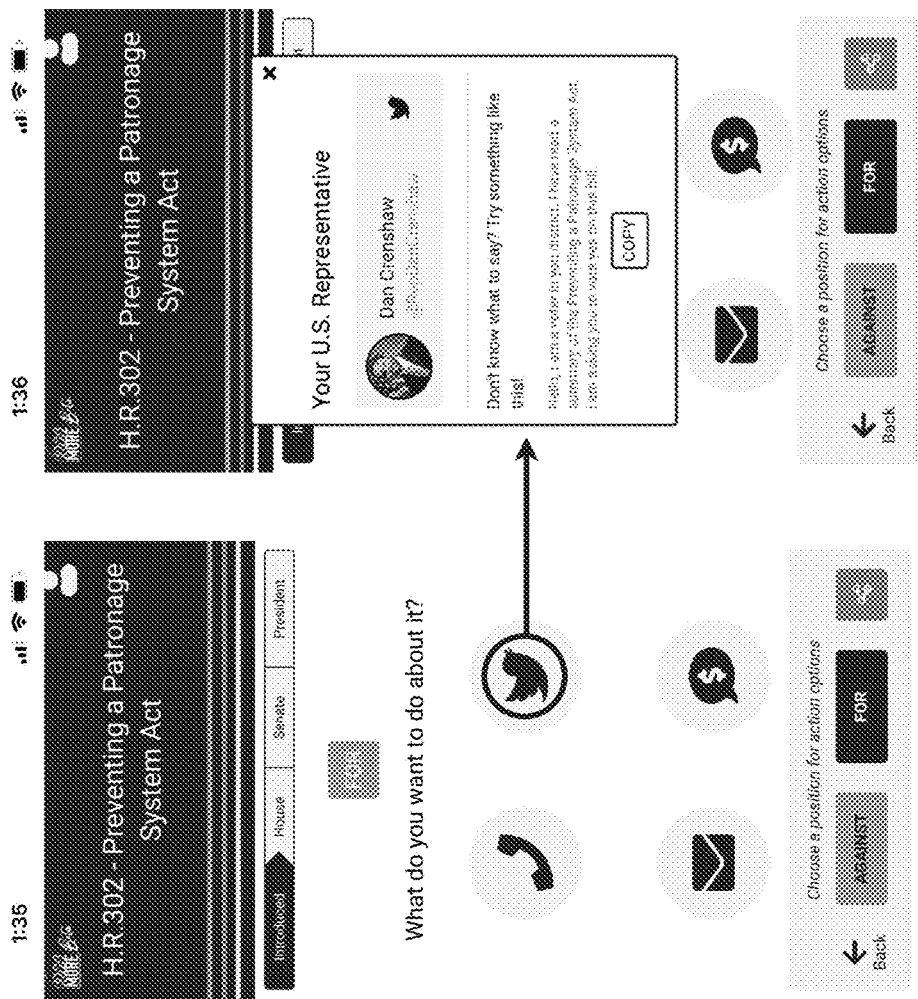

1000 MORE SYSTEM FOR POLITICAL ENGAGEMENT

TECHNICAL FIELD

This disclosure is related to a technological system that facilitates, informs, and enhances political engagement by the user with local, state, and national politicians and legislative bodies.

BACKGROUND

Events and societal trends recent to the time of this filing have led a section of the American populace to be particularly interested in laws, regulations, policies, political candidates, political officeholders, and upcoming elections. However, despite a 24/7 news cycle and the rise of independent political reporting, newscasting, and podcasting, it remains difficult for individuals to find concise, factual, non-partisan information about elections and the status of legislation being considered by their elected officials at all levels.

In the age of social media, it is not uncommon for the potential confirmation of a political appointee or a proposed piece of legislation that may have a profound impact on people's lives to gain traction on the Internet. Whether the political appointee is a Supreme Court justice or whether the proposed piece of legislation is on a hot-button issue like gun regulation or reproductive justice, individuals get "fired up" and calls for action are embodied in Tweets, Facebook posts, Tiktok videos, or other social media posts—"Call or email your representative today!" However, many individuals are unaware of exactly how to accomplish that, despite the fact that contacting their elected officials is one of the best ways to influence their vote. They would need to determine who their representative is, locate the appropriate phone number or email address, and formulate what to say. That final point alone may be enough to deter many individuals, especially those from traditionally marginalized, disenfranchised, and disengaged communities. Furthermore, many individuals recognize that there are powerful groups that have profound influence on elected officials and believe that their voice cannot compete with that level of organized power. Still further, individuals may wish to donate to candidates or causes and may be unaware of where to donate, or may be unaware of where to donate to maximize the effect of their donation.

A system that eliminates these barriers to civic participation and harnesses collective political power and voice year-round is therefore needed.

SUMMARY

The "1000 MORE" system allows average Americans to disrupt big lobbying groups and realize their full civic power throughout each legislative session by providing clear, concise, accurate, non-partisan information about upcoming legislative votes, connecting constituents to elected officials, and crowdfunding advocacy efforts.

Indeed, the "1000 MORE" system facilitates education about bills coming up for a vote by offering short summaries of pending legislation as well as popular arguments for and against the bill. The user can indicate whether they are "for" or "against" the bill. Then, the user is given four options. The user can call, email or Tweet their elected official's office directly, or donate to an organization that is advocating either for or against the bill to thereby crowdfund advocacy efforts on legislation.

As constituent users use the app, they collect points for a civic engagement score that can be found in their profile. Furthermore, as we collect data about their political preferences, we can report that information back to them in various forms, including during election season. We can tell them which candidates are most aligned with their political positions they've reported on the app. With that information they can opt into supporting one candidate per race and will be given options to contact them or donate to them. Additionally, the 1000 MORE system will be able to build sample ballots for them to print and take into the voting booth with each of the candidates they chose in each of the races on their ballots, creating a hyper personalized voter guide.

Elected officials can access a separate interface where they see how their constituents are voting on the bills on the app in real-time. They can communicate with their constituents through the 1000 MORE system. Additionally, the 1000 MORE system can provide data to them about their own constituencies and that of their peers.

Advocacy organizations can access a separate interface where they are able to read about bills on the app and indicate whether they are for or against a bill to start raising money. They can then track their fundraising on each bill on 1000 MORE.

Voters can check their voter registration and register to vote on the app.

1000 MORE is a centralized source for all civic engagement for constituents, advocacy organizations and elected officials. It is a digitized political marketplace.

To that end, disclosed herein is a system including a server, and a user device comprising a communications interface for data communications with the server over the Internet. The user device includes non-volatile memory storing instructions that, when executed by a microprocessor within the user device, configure the user device to: enroll a user of the user device by collecting at least a home address of the user and transmitting the home address to the server; retrieve public offices associated with the user's home address from the server and retrieve elected officials associated with those public offices; obtain a list of currently pending pieces of legislation that the user's elected officials may vote upon from the server; and display a home screen to the user, the home screen including the list.

In response to the user selecting one of the pending pieces of legislation, the user device: retrieves a factual summary of the pending piece of legislation together with arguments in favor of and against the pending piece of legislation from the server and displaying the factual summary and arguments to the user, receives user input indicating whether the user is in favor of or against the pending piece of legislation; builds a user profile based upon the user input; retrieves from the server a list of elected officials for the public offices associated with the user's home address who are responsible for that pending piece of legislation; displays to the user options to call, e-mail, or contact the elected officials associated responsible for voting on that piece of legislation; displays to the user an option to crowdfund advocacy efforts by donating to a group advocating for the pending piece of legislation if the user indicated they favor the pending piece of legislation; displays to the user an option to crowdfund advocacy efforts by donating to a group advocating against the pending piece of legislation if the user indicated they are against the pending piece of legislation; and in response to user selection to crowdfund the advocacy efforts, causes the user device to effectuate a transfer of funds from an account associated with the user to the group advocating.

For the selected option to call, e-mail, or contact the elected officials responsible for voting on that piece of legislation, the user device: in response to user selection to call, e-mail, or contact the elected official via social media, generates contact information for the selected official on the selected mode of communication and a script and causes the user device to effectuate calling or e-mailing the elected official via the usual functionality of the user device, or causes the user device to contact the elected official via social media via an appropriate application.

The microprocessor of the user device, when executing the instructions stored in the non-volatile memory, further configures the user device to: retrieve from the server a list of candidates for the public offices associated with the user's home address; identify for the user one or more of the list of candidates who most closely match the user's profile such that those candidates support a majority of the pieces of legislation that the user is in favor of and oppose a majority of the pieces of legislation that the user is against; display the list of candidates to the user; display for the user how each of the candidates aligns with their user profile; receive user input indicating which of the candidates the user desires to support; retrieve engagement options from the server for the candidates that the user desires to support; and display the engagement options to the user.

The microprocessor of the user device, when executing the instructions stored in the non-volatile memory, further configures the user device to: retrieve contact and donation options from the server for the candidates of the list that the user desires to support; display the contact and donation options to the user; receive user input indicating a desired one of the contact or donation options; and take an action based upon the user input.

Taking the action may be facilitating user donation to a campaign of a candidate for which the user indicated support.

Taking the action may be facilitating user donation to an organization advocating for legislation supported by a candidate for which the user indicated support or to an organization advocating against legislation opposed by the candidate for which the user indicated support.

The microprocessor of the user device, when executing the instructions stored in the non-volatile memory, may further configure the user device to cooperate with the server to generate a sample ballot for the user that indicates the candidates associated with the user's home address who most closely match the user's profile, and display the sample ballot to the user.

The user device may be a plurality thereof; and further an elected official device may include a communications interface for data communications with the server over the Internet, the elected official device also having non-volatile memory storing instructions that, when executed by a microprocessor within the elected official device, configure the elected official device to cooperate with the server to generate a tracking interface showing how many of the elected official's constituents have indicated that they are in favor of the pending pieces of legislation and how many of the elected official's constituents have indicated that they are against the pending pieces of legislation, and configure the elected official device to facilitate communication with constituents of the elected official.

An advocacy organization device may include a communications interface for data communications with the server over the Internet, the advocacy organization device further comprising non-volatile memory storing instructions that, when executed by a microprocessor within the advocacy organization device, configure the advocacy organization device to accept input indicating which of the pending pieces of legislation the advocacy organization supports and accept advocacy organization input indicating which of the pending pieces of legislation the advocacy organization opposes and communicate the advocacy organization input to the server such that when the engagement options displayed to the user include donation to the advocacy organization, the user device retrieves the advocacy organization input, displays it to the user, and facilitates receipt of donations from the user.

BRIEF DESCRIPTION OF THE DRAWINGS

FIG. 6D-6E are a series of examples showing a user tapping on a specific legislator and the action items that appear.

FIGS. 8A-8B are a series of examples showing the home screen of the 1000 MORE application when the user taps on the inbox action item.

FIG. 10A-10B are a series of examples showing the home screen of the 1000 MORE application when the user taps on the user profile icon.

FIGS. 12A-12B are series of examples showing the 1000 MORE application when the user taps on the "call" action item after having they support a piece of legislation.

FIGS. 13A-13B are series of examples showing the 1000 MORE application when the user taps on the "Social Media" action item after having they support a piece of legislation.

DETAILED DESCRIPTION

Figure 1:
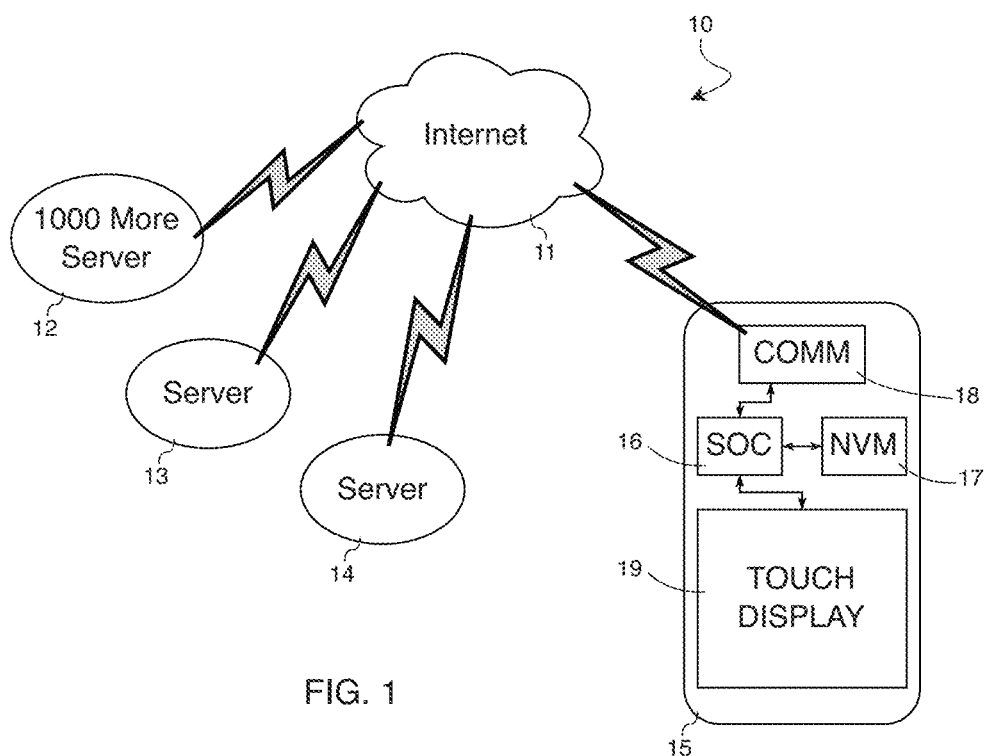
FIG. 1 is a block diagram of the 1000 MORE system and application disclosed herein.

The following disclosure enables a person skilled in the art to make and use the subject matter disclosed herein. The general principles described herein may be applied to embodiments and applications other than those detailed above without departing from the spirit and scope of this disclosure. This disclosure is not intended to be limited to the embodiments shown, but is to be accorded the widest scope consistent with the principles and features disclosed or suggested herein. Do note that in the below description, any described resistor or resistance is a discrete device unless the contrary is stated, and is not simply an electrical lead between two points. Thus, any described resistor or resistance coupled between two points has a greater resistance than a lead between those two points would have, and such resistor or resistance cannot be interpreted to be a lead. Similarly, any described capacitor or capacitance is a discrete device unless the contrary is stated, and is not a parasitic unless the contrary is stated. Moreover, any described inductor or inductance is a discrete device unless the contrary is stated, and is not a parasitic unless the contrary is stated.

First, the specific hardware system 10 utilized in the 1000 MORE system will be described with reference to FIG. 1, and thereafter the operation of the 1000 MORE system will be described with reference to the remainder of the drawing figures.

The hardware system 10, as shown in FIG. 1, includes the 1000 MORE server 12 connected to the Internet 11 for bidirectional communication with an electronic device 15. The electronic device 15 is illustrated as a smartphone but may in fact be any computing device with Internet connectivity (e.g., tablet, laptop computer, desktop computer, smartwatch, etc). The electronic device 15 in its smartphone form includes system-on-a-chip (SOC) 16 in bidirectional data communication with non-volatile memory 17, a communication interface 18, and a touch sensitive display 19. As understood by those of ordinary skill in the art, a SOC includes at least a microprocessor and volatile memory and may include WiFi and cellular modems. The communication interface 18 (e.g., antenna circuitry in the case where the SOC 16 includes a modem, or a modem plus antenna circuitry in the case where the SOC 16 does not include a modem) facilitates bidirectional transfer of data between the SOC 16 and the Internet (and therefore the 1000 MORE server 12). The non-volatile memory 17 stores executable code that is executed by the SOC 16, such executable code causing the SOC 16 to perform the functionality of the 1000 MORE system. The touch display 19 facilitates the presenting of data from the 1000 MORE system to users and the receiving of touch input from users.

Operation will now be described. In the following description, note that the SOC 16 of the electronic device 15 either executes the 1000 MORE system as an application or executes a web browser which accesses an instance of the 1000 MORE system operating on the 1000 MORE server 12. Where the electronic device 15 executes the 1000 MORE system as an application, the execution of the application includes the retrieval of data from the 1000 MORE server 12 to display to the user on the touch sensitive display 19.

Figure 2:
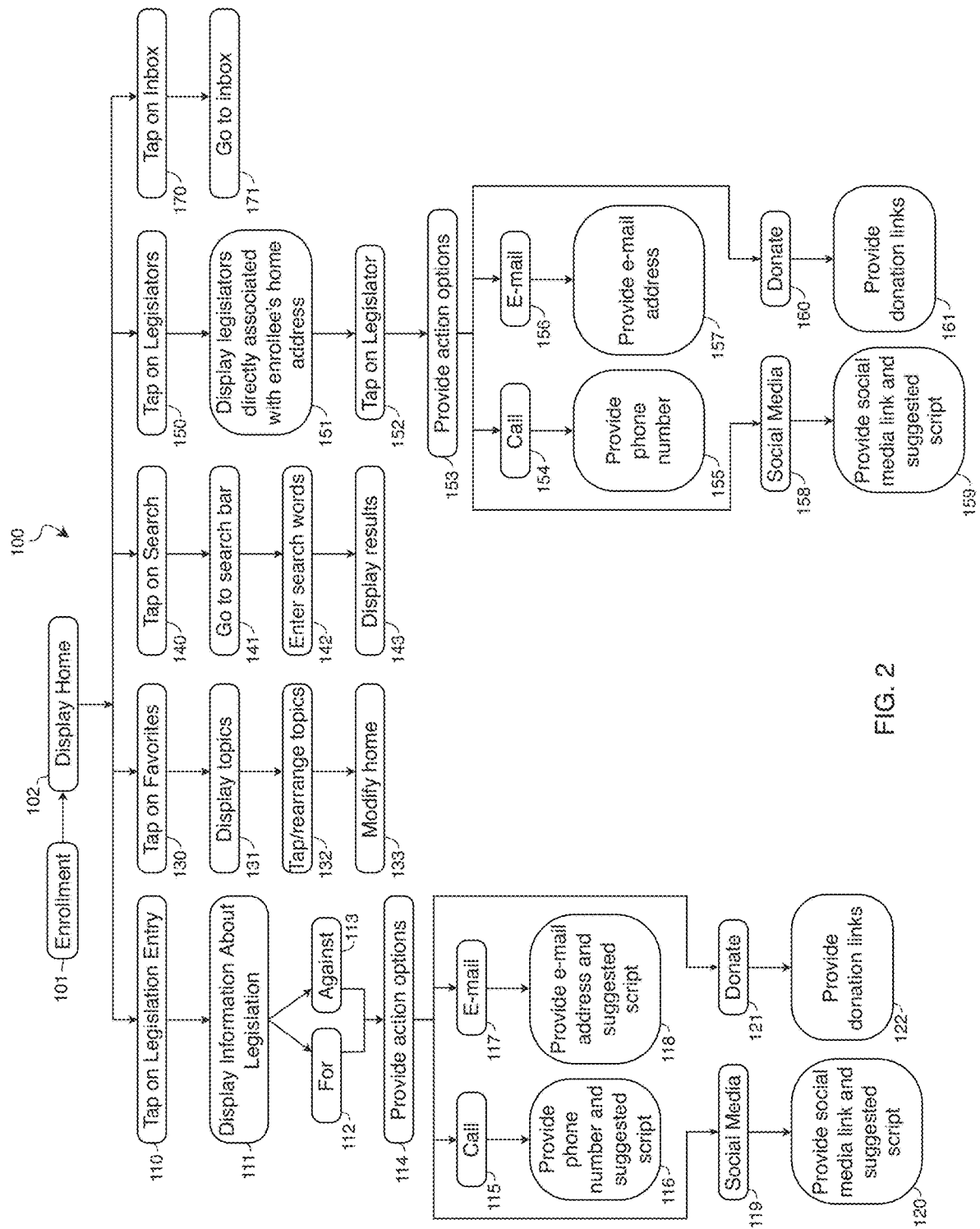
FIG. 2 is a flowchart illustrating steps of operation of the 1000 MORE system.
Figure 4:
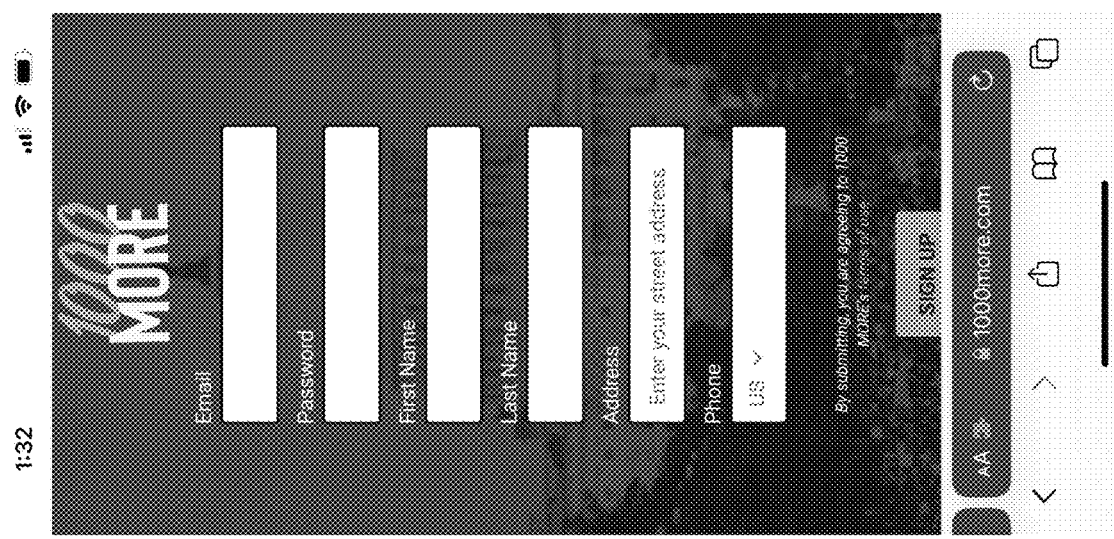
FIG. 4 is an example of operation of the 1000 MORE system showing the voter user registration screen of the 1000 MORE application.
Figure 3:
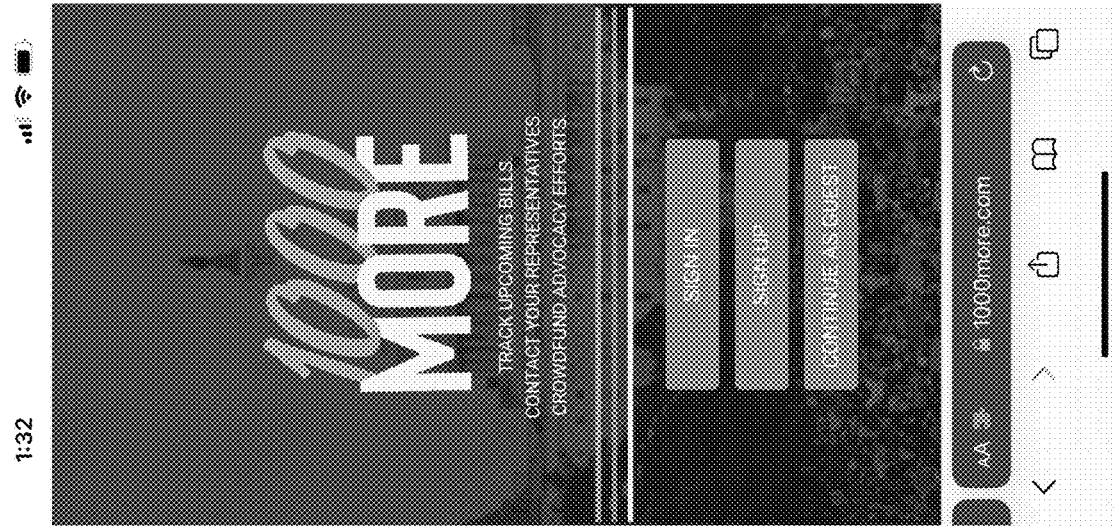
FIG. 3 is an example of operation of the 1000 MORE system showing the opening screen of the 1000 MORE application.

Refer now to the flowchart of FIG. 2. Operation will be described in the context of the electronic device 15 executing the 1000 MORE system as an application. When the 1000 MORE system is first accessed via application execution, an opening screen shown in FIG. 3 is displayed to the user. Enrollment (Block 101 in the flowchart) is then performed. The enrollment screen is illustrated in FIG. 4, and during enrollment the user's e-mail address, first name, last name, street address, desired password, and optionally phone number are received as input and communicated to the 1000 MORE server 12. Since the street address of a voter's primary residence determines who that voter's elected officials are, the 1000 MORE server 12 determines which districts for elected officials the user's street address is in and from this looks up who the voter's elected officials are. The looked-up elected officials may be federal elected officials (e.g., US congressman, US senator, president, vice president, etc) and/or state elected officials (e.g., state congressman, state senator, governor, lieutenant governor, attorney general, secretary of state, etc) and/or local elected officials (e.g. city council member, school board member, etc). From the looked-up elected officials, a home screen is assembled and displayed to the user (Block 102 in the flowchart). The home screen is illustrated in FIG. 5 and displays a scrollable list of currently pending pieces of legislation that the user's elected officials may be voting upon.

Figure 5:
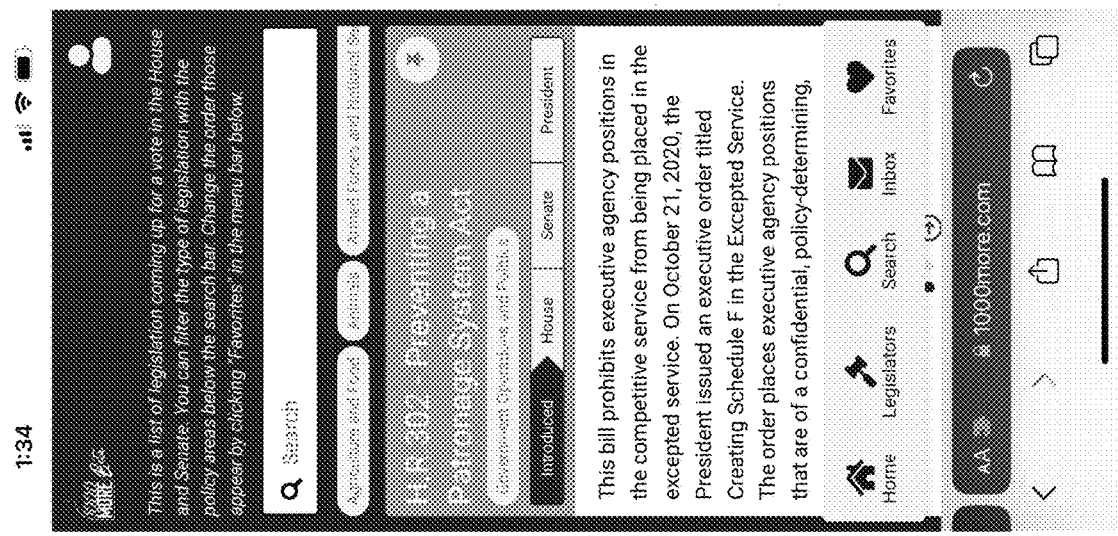
FIG. 5 is an example showing the home screen of the 1000 MORE application when being used by a voter user.

Before discussing the operation when the user taps on (selects) an individual piece of legislation, notice the menu at the bottom of the home screen in FIG. 5 presenting the options "Home", "Legislators", "Search", "Inbox", and "Favorites".

If the user taps on the "Home" option, operation returns to the home screen; if the user is already on the home screen, tapping on the "Home" option returns the user to the top of the home screen.

Figures 6A, 6B, 6C:
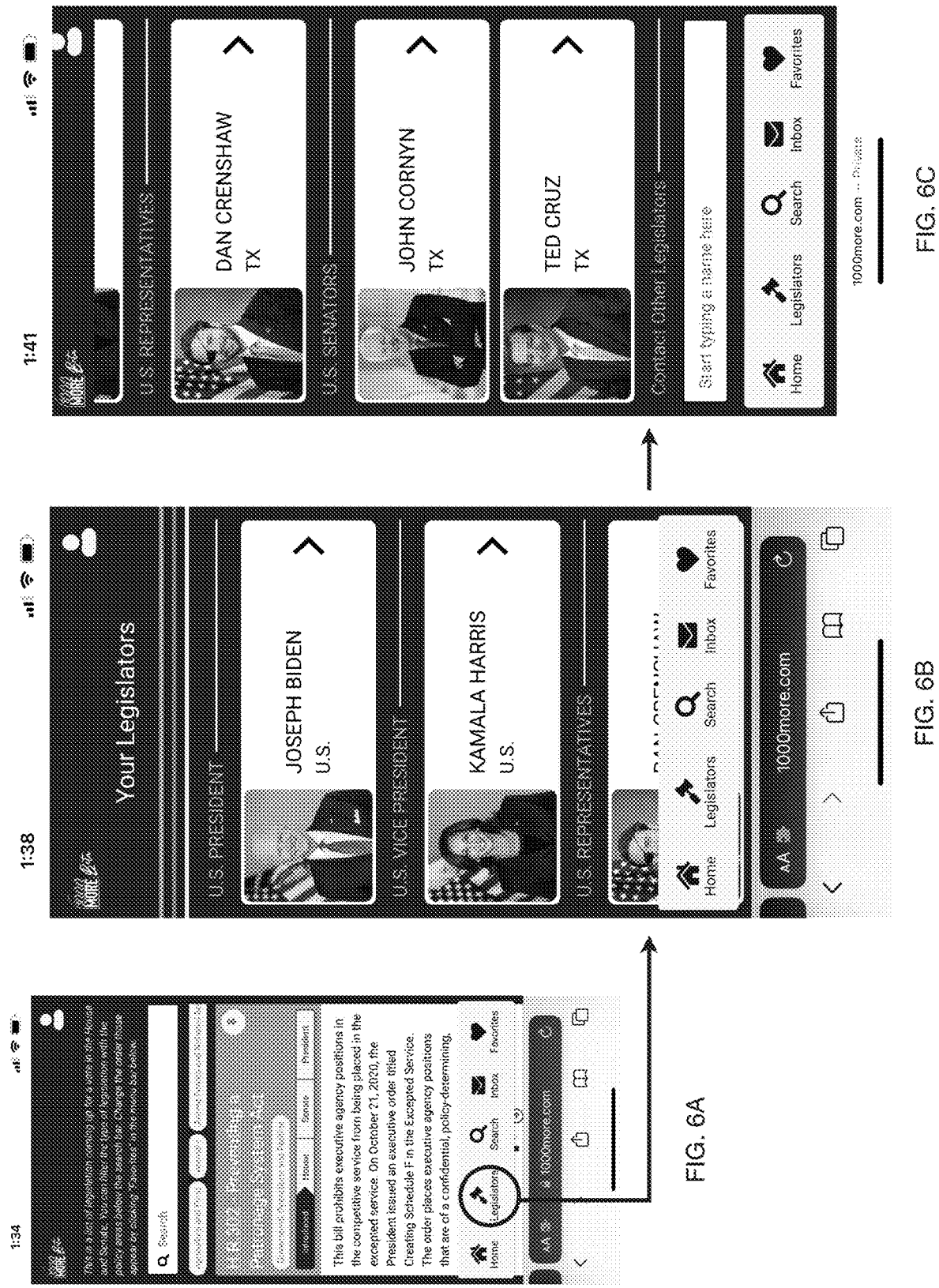
FIGS. 6A, 6B, and 6C are a series of examples showing the home screen of the 1000 MORE application when the user taps on the legislator action item and scrolls through the list of legislators.

If the user taps on the "Legislators" option (Block 150 in the flowchart) as shown in FIG. 6A, a scrollable list of the elected officials associated with the user's home address is displayed (Block 151 in the flowchart) as shown in FIGS. 6B-6C. If the user taps on a specific legislator (Block 152 in the flowchart) as shown in FIG. 6D, action options are provided for that legislator (Block 153 in the flowchart) as shown in FIG. 6E. In addition, information about the legislator tapped on may be provided. For example, the party registration, a summary of their platform, and their entire voting record may be provided. The action items include "Call", "E-mail", and "Social Media" (Twitter in the specific illustrated instance). If the user taps on the "Call" action item (Block 154 in the flowchart), the user's device brings up the relevant phone number for the selected legislator in the phone application (Block 155 in the flowchart). If the user taps on the "Social Media" action item (Block 158 in the flowchart), the user's device brings up the social media page of the selected legislator in the appropriate social media application (Block 159 in the flowchart). If the user taps on the "E-mail" action item (Block 156 in the flowchart), the user's device opens the e-mail application with an e-mail started to the relevant e-mail address for the legislator (Block 157). Although not specifically illustrated in FIG. 6E, there may also be a "Donate" action item that, when tapped on by the user (Block 160 in the flowchart), includes additional action items leading to the various ways in which the user can donate to that politician's campaign (Block 161 in the flowchart). For example, different advocacy groups may be presented and the user may tap on one of them. When tapped upon, a profile for the advocacy group may be presented, including information about how to contact the advocacy group, the platform of the advocacy group, and information about legislation the advocacy group has advocated for and against. Still further, specific work performed by the advocacy group in advoking for or against the piece of legislation may tracked and a summary thereof may be presented.

Figure 7B:
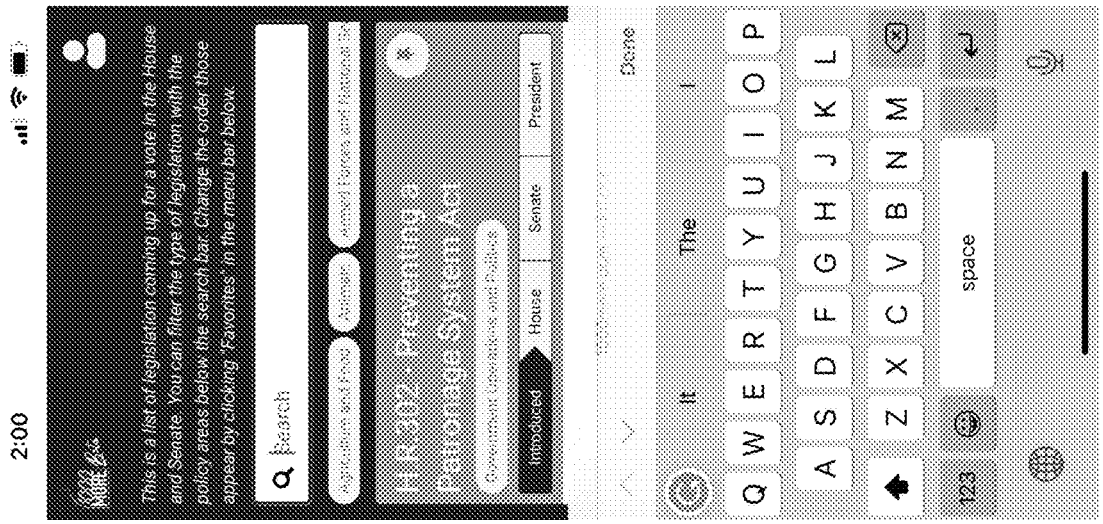
FIGS. 7A-7B are a series of examples showing the home screen of the 1000 MORE application when the user taps on the search action item.
Figure 7A:
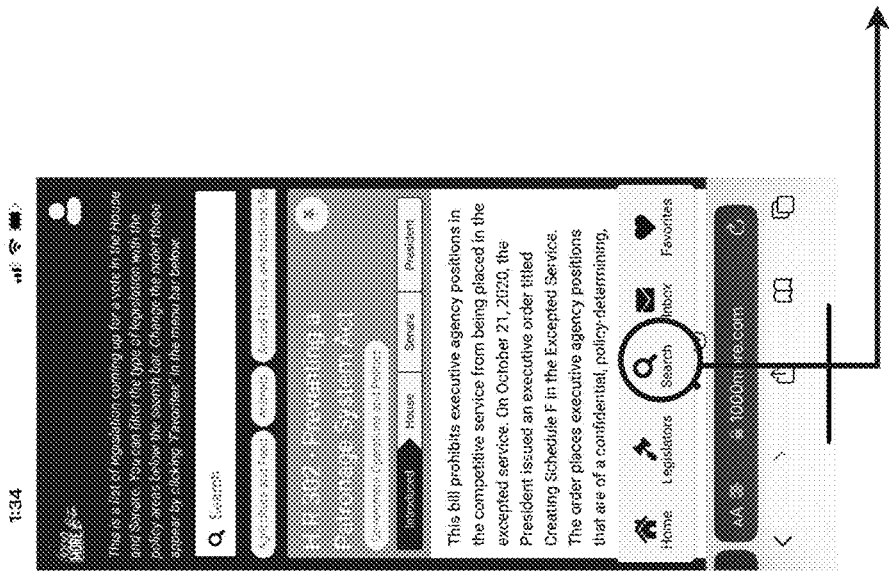

Returning to discussion of the home screen, if the user taps on the "Search" option (Block 140 in the flowchart) as shown in FIG. 7A, the user is asked to enter text into the search bar (Block 141 in the flowchart) as shown in FIG. 7B. Once the user enters search words (Block 142 in the flowchart), the home screen is updated to display legislation responsive to the search results (Block 143 in the flowchart).

If the user taps on the "Inbox" option (Block 170 in the flowchart) as shown in FIG. 8A, the user's inbox within the 1000 MORE application is displayed as shown in FIG. 8B and the user may then interact with their inbox.

Figure 9A:
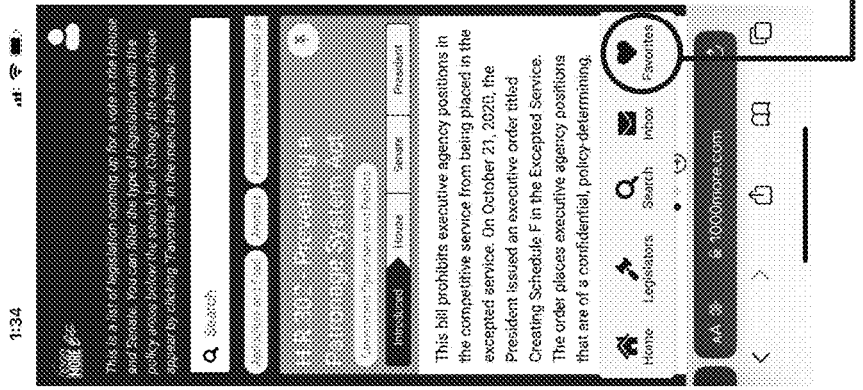
FIGS. 9A, 9B, and 9C are a series of examples showing the home screen of the 1000 MORE application when the user taps on the favorites action item and scrolls through the list of legislative topics.
Figure 9B:
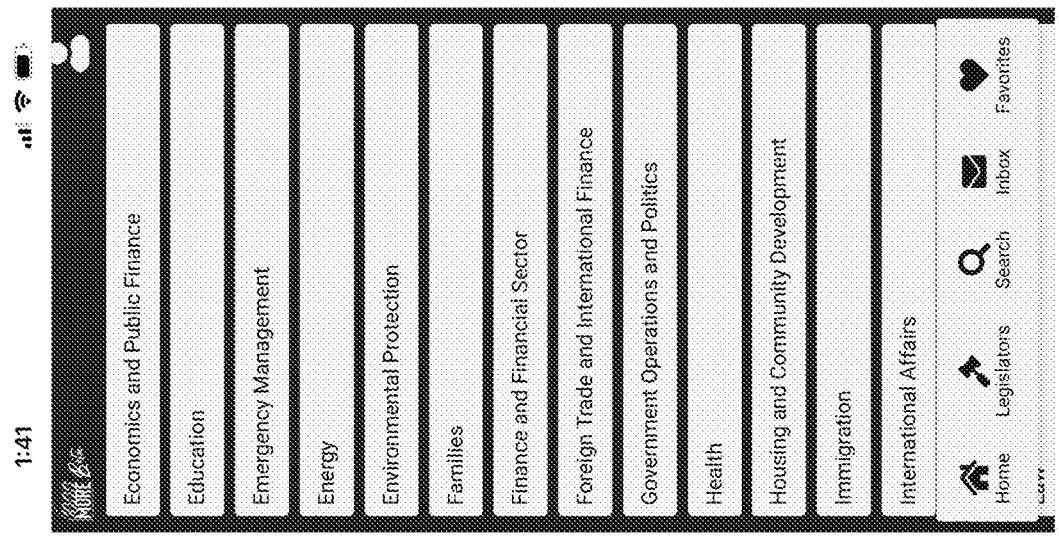
Figure 9C:
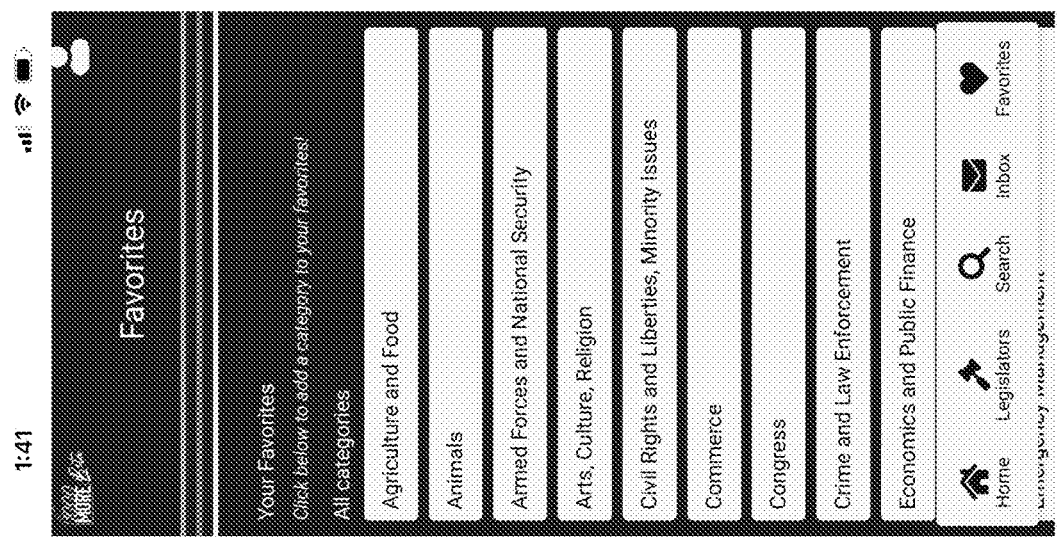

If the user taps on the "Favorites" option (Block 130 in the flowchart) as shown in FIG. 9A, legislative topics are displayed to the user (Block 131 in the flowchart) as shown in FIGS. 9B-9C. The user may tap on the topics (Block 132 in the flowchart) to assemble a list of topics the user is particularly interested in them. The home screen displays legislation relative to the user's favorite topics first (Block 133 in the flowchart). The user may organize the list of favorited topics by interest such that the home screen displays legislation regarding policy areas of greater interest first in a scrolling list. The user may also apply a filter from this screen such that legislation regarding policy areas in which the user is not interested is not displayed.

Notice there is also a user profile option in the home screen in the upper right-hand corner. If the user taps on the user profile option as shown in FIG. 10A, an engagement score for the user is displayed as shown in FIG. 10B. The engagement score may include information such as the number of calls, e-mails, social media contacts, and donations the user has initiated through the 1000 MORE application, effectively gamifying civic engagement. An option to connect with other users (e.g., friends) may be provided, enabling friendly competition and accountability regarding civic engagement. The user profile may be edited to contain such information about the user as the user desires to disclose, for example, a picture of the user may be added, and this picture may be auto-inserted into e-mail and social media messages initiated from within the 1000 MORE application.

Figure 11C:
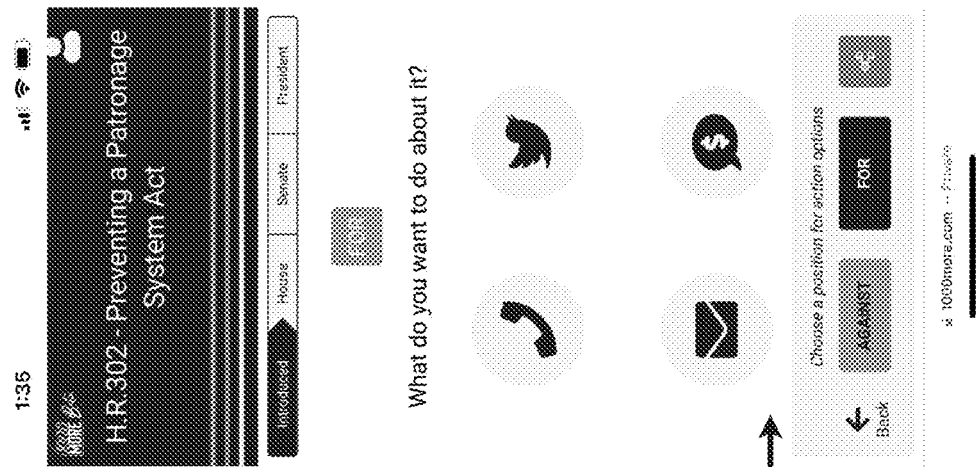
FIGS. 11A-11C are a series of examples showing the home screen of the 1000 MORE application when the user taps on a specific piece of legislation and indicates they support the piece of legislation.
Figure 11B:
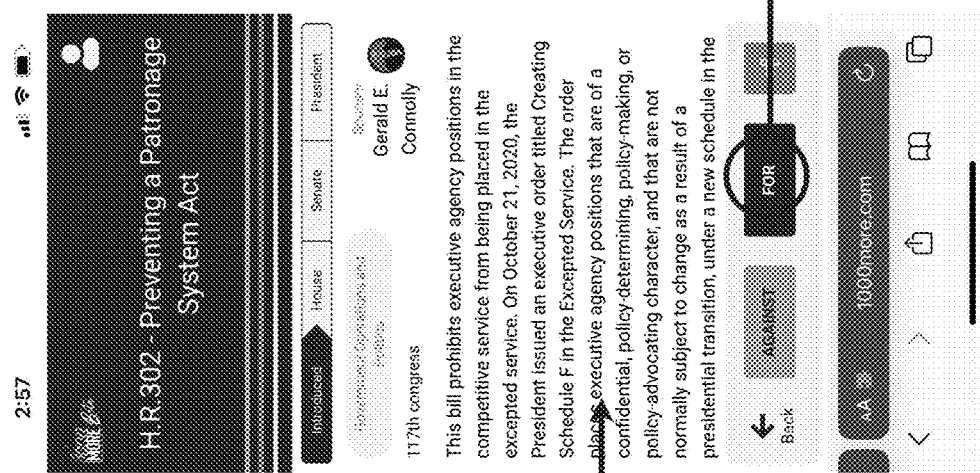
Figure 11A:
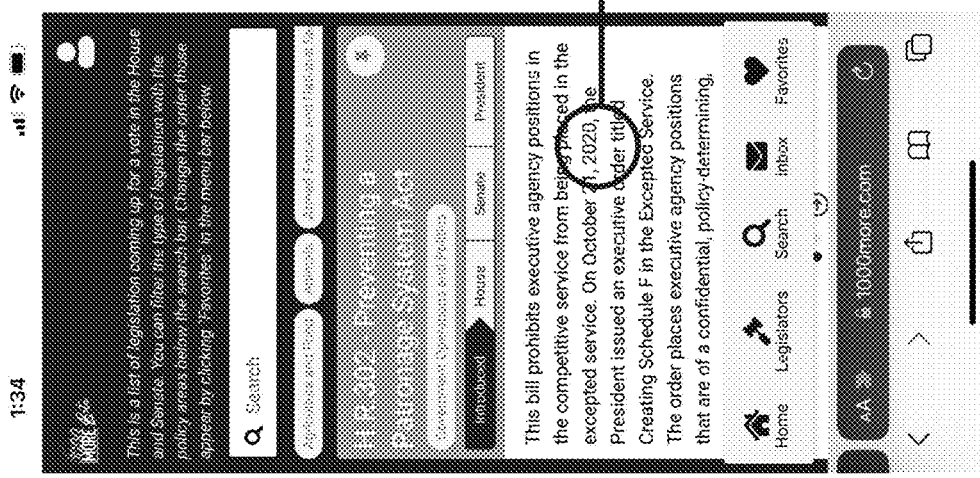

Returning again to the discussion of the home screen, in the user taps on a piece of legislation (Block 110 in the flowchart) as shown in FIG. 11A, a concise, factual, non-partisan summary of the piece of legislation is displayed to the user (Block 111 in the flowchart) as shown in FIG. 11B. In addition to the summary, brief arguments for and against the piece of legislation may be displayed, aiding the user's understanding of common positions held by those in favor of and those against the piece of legislation, helping to provide the user with consideration of the piece of legislation.

Still further, personalized data about how the piece of legislation personally impacts the user may be provided—for example, the piece of legislation may change available tax deductions. In order for this specific functionality to be provided, the user will have provided the sufficient information (for example in their user profile) for the personal impact to be determined. This information may be the user's income range, if and how many children the user has, if the user owns a business, if the user owns a home, etc.

Figures 11D, 11E:
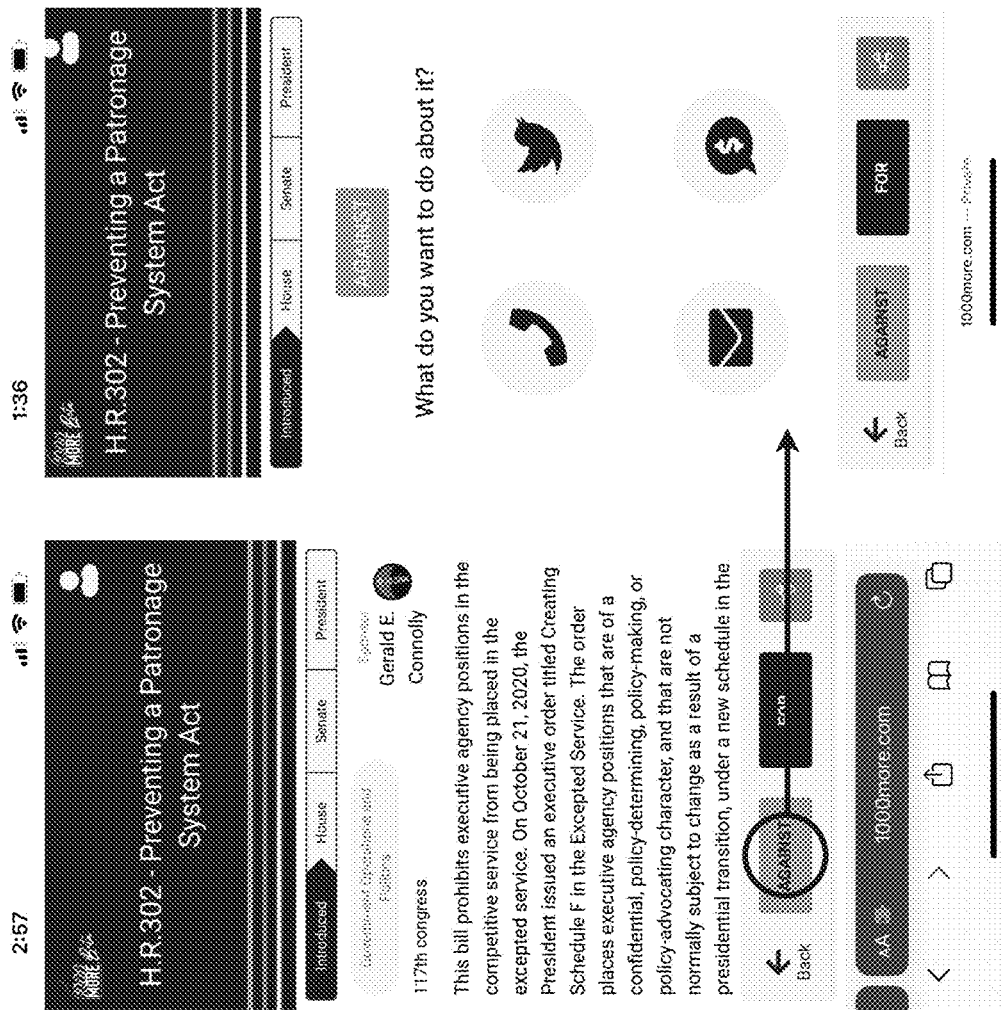
FIGS. 11D-11E are a series of examples showing the 1000 MORE application when the user taps on a specific piece of legislation and indicates they do not support the piece of legislation.

Input is then requested from the user—is the user for or against the piece of legislation? If the user indicates that they are for the piece of legislation (Block 112 in the flowchart) as shown in FIG. 11B, then action items are provided to the user (Block 114 in the flowchart) as shown in FIG. 11C. If the user indicates that they are against the piece of legislation (Block 113 in the flowchart) as shown in FIG. 11D, then action items are provided to the user (Block 114 in the flowchart) as shown in FIG. 11E. In both cases (for or against) these action items are "Call", "E-mail", "Social Media", and "Donate". The following description of the action items will be in the context of the user indicating they are for the piece of legislation, but it should be understood that the action items will be the same in the context of the user indicating they are against the piece of legislation.

Turning now to the action items, if the user taps on the "Call" action item (Block 115 in the flowchart) as shown in FIG. 12A, the user's device displays the relevant phone number for the relevant legislator (Block 116 in the flowchart) together with a suggested script of talking points for the user to use/consider when speaking to the legislator's office, as shown in FIG. 12B. If the user taps on the illustrated phone icon, the user's device brings up the relevant phone number for the selected legislator in the phone application.

If the user taps on the "Social Media" action item (Block 119 in the flowchart) as shown in FIG. 13A, the user's device displays the social contact information for the relevant legislator together with a suggested message to send to the legislator (Block 120 in the flowchart) as shown in FIG. 13B. If the user taps on the illustrated social media icon, the user's device brings up the legislator's page in the appropriate social media application.

Figures 14A, 14B:
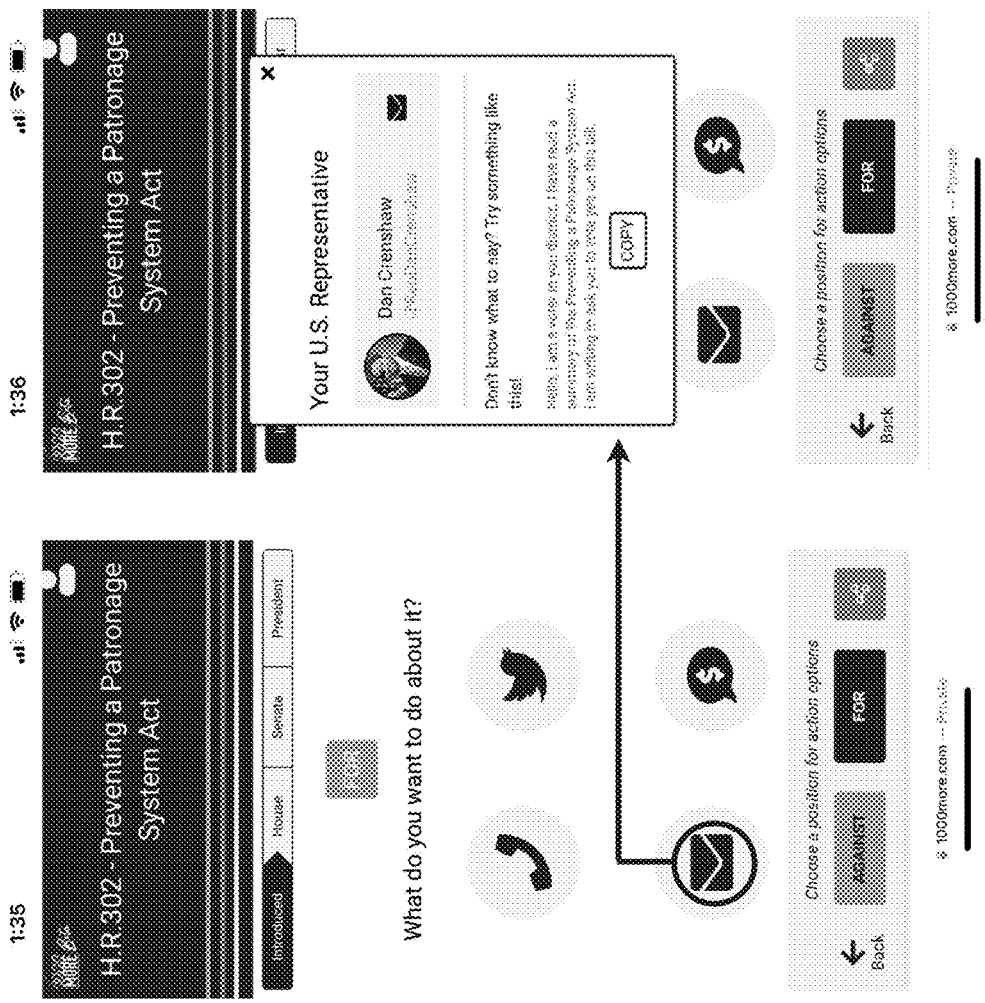
FIGS. 14A-14B are series of examples showing the 1000 MORE application when the user taps on the "E-mail" action item after having they support a piece of legislation.

If the user taps on the "E-mail" action item (Block 117 in the flowchart) as shown in FIG. 14A, the user's device displays the e-mail address for the relevant legislator together with a suggested message to send to the legislator (Block 118 in the flowchart) as shown in FIG. 14B. The user is provided with the option to copy the suggested message into the "clipboard" of their device. If the user then taps on the e-mail icon, the user's device opens the e-mail application with an e-mail started to the relevant e-mail address for the legislator.

If the user taps on the "Donate" action item (Block 121 in the flowchart), the user is provided with links to organizations raising money toward lobbying for the user's position (for against) on the specific piece of legislation (Block 122 in the flowchart). The user may then tap on one of those links to donate to the desired organization that is lobbying for the user's position on the legislation.

An option may be presented to the user to view a personalized voter guide. The personalized voter guide may be assembled based upon a comparison between the user's indicated positions on pieces of legislation and the voting records of their legislators, for example by showing for each legislator running for election in the user's district how many times that legislator voted for pieces of legislation supported by the user and pieces of legislation not supported by the user. Additionally, the user may be shown how the platform of each legislator running for election in the user's district aligns with pieces of legislation supported by the user and pieces of legislation not supported by the user. Utilizing this hyper-personalized data provided in the voter guide, the user can feel confident that they are supporting the candidate who most aligns with their votes. Still further, options may be provided to the user to connect with and donate to the campaigns of candidates. Contact information and social media contact information of the candidates and their campaigns may be provided to the user.

An option may be presented to the user that connects the user with available civic opportunities, such as volunteering for campaigns of candidates supported by the user, volunteering for advocacy organizations supported by the user, volunteering for civic organization such as "Get Out the Vote" groups, volunteering to act as a poll worker, etc.

In the above, the functionality of the 1000 MORE application has been presented in the context of the user being a voter or constituent. Notably, however, the 1000 MORE application may have a government service user mode of operation as well. In the government service user mode of operation, a registered government service user has a profile in the 1000 MORE application in which they have indicated which legislator or legislators they are associated with (or if they are in fact the legislator). For example, government service users may be members of a legislator's staff. A government service user may additionally or alternatively indicate which district or districts they are associated with in their profile.

Figure 15B:
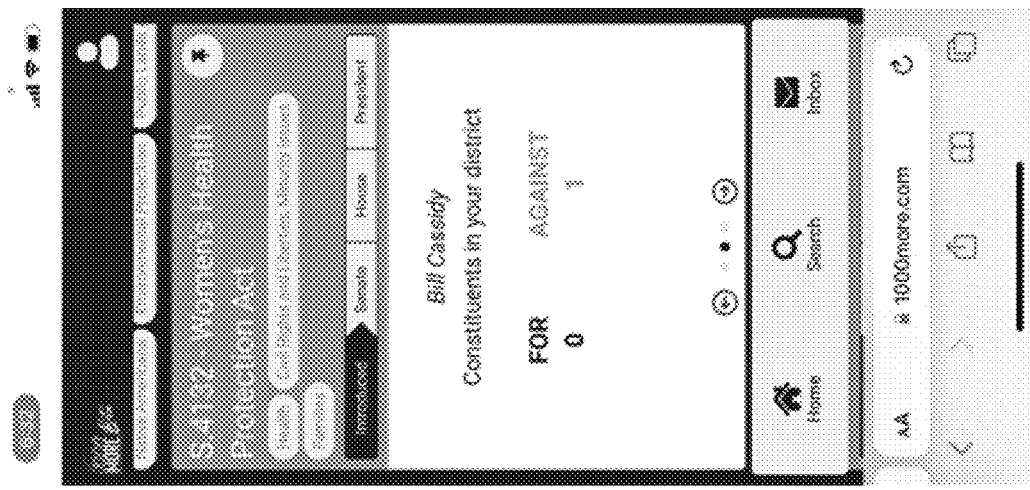
FIGS. 15A-15B are a series of examples showing the 1000 MORE application when operating in the government service user mode of operation.
Figure 15A:
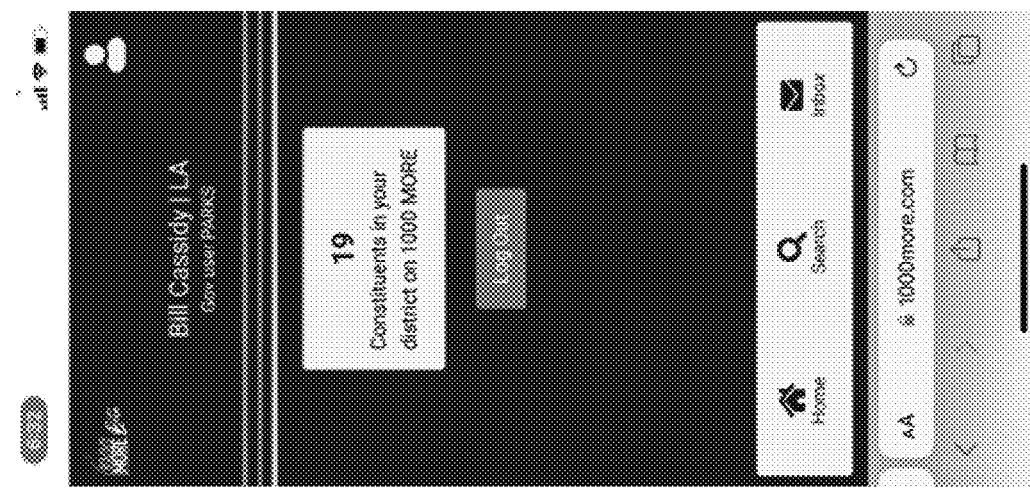

Sample screens of operation in the government service user mode are shown in FIGS. 15A-15B. Upon logging in, the government service user's home screen is displayed. On this home screen, it is shown how many of the government service user's constituents are registered with the 1000 MORE application—this is shown in the example in FIG. 15A, in which the government service user is named "PARKS", and is associated with Senator Bill Cassidy of Louisiana. In the government service user mode of operation, the indicated positions of voter users of the 1000 MORE application on pieces of legislation may be tracked and displayed in real time, effectively giving instant feedback to the government service user about how constituents in the district or districts associated with that government service user feel about pieces of legislation, as shown in FIG. 15B. This may help change a legislator's mind about how they plan to vote on legislation or may strengthen a legislator's resolve about how they plan to vote on legislation. In the example of FIG. 15B, the government service user PARKS is now aware that one of Senator Cassidy's constituents (registered with the 1000 MORE application) has indicated that they are against the Woman's Health Protection Act and that none of Senator Cassidy's constituents (registered with the 1000 MORE application) have indicated that they are against the Woman's Health Protection Act.

A government service user may submit certain verification information to the 1000 MORE application in return for which a verification label may appear next to the legislator associated with the government service user when that legislator appears in the 1000 MORE application during operation by voter users. This indicates to voter users that the legislator is listening to their positions on legislation. Naturally, the legislator may advertise this verification outside of the 1000 MORE application as well.

A government service user may provide their rational for support of or opposition to a given piece of legislation, and this may be provided to the voter user when they click on the associated legislator from within the legislation summary view. This allows the voter user to understand their legislator and may perhaps change the voter user's mind or strength the voter user's resolve.

A government service user may also be provided with the option to see the indicated positions of voter uses in districts other than the district or districts associated with the government service user. This information may be used by a legislator during negotiations with other legislators. For example, legislators may strike a deal to support each other's bills based upon this information.

In the above, the functionality of the 1000 MORE application has been presented in the context of the user being a voter user or a government service user. However, the 1000 MORE application may have an advocacy group user mode of operation as well. In the advocacy group user mode of operation, the advocacy group user has a profile in which they can display their platform, which pieces of legislation they advocate for, which pieces of legislation they advocate against (or oppose but do not direct specific advocacy operations against), and the reasons for their advocacy for or against pieces of legislation. The 1000 MORE application may permit the advocacy group user to retrieve a list of voter users who agree with one or more of their advocacy positions and specific details about which positions those users agree or disagree with, and may permit the advocacy group user to contact those users or display advertising to those users to solicit donations or volunteers. In addition, the 1000 MORE application may provide the advocacy group user with a donation tracker showing what donations they have received that were initiated through the 1000 MORE application and what led to those donations (e.g., from which piece of legislation voter users initiated the contact with the advocacy group to provide the donation, and whether the voter user was for or against the piece of legislation).

The advantages provided by the 1000 MORE system are numerous. For example, voter users are empowered for civic participation with concise, accurate, non-partisan information, the ability to contact their legislators easily and quickly, and their easy access to advocacy organization that support or oppose legislation that the voter user supports of opposed. In addition, legislators themselves benefit by receiving data from their constituency (voter users in their district) in real time, informing them of how their constituents want them to vote, informing them of the issues their constituents care most about, assisting them to therefore be more effective legislators and in turn with reelection. Still further, advocacy organizations benefit from increased exposure and the increased donations that may ensue.

It is clear that modifications and variations may be made to what has been described and illustrated herein, without thereby departing from the scope of this disclosure, as defined in the annexed claims.

While the disclosure has been described with respect to a limited number of embodiments, those skilled in the art, having benefit of this disclosure, will appreciate that other embodiments can be envisioned that do not depart from the scope of the disclosure as disclosed herein. Accordingly, the scope of the disclosure shall be limited only by the attached claims.

The invention claimed is:

1. A system, comprising:
   a server;
   a plurality of user devices each comprising a communications interface for data communications with the server over the Internet, the user device further comprising non-volatile memory storing instructions that, when executed by a microprocessor within the user device, configure the user device to:
   enroll a user of the user device by collecting at least a home address of the user and transmitting the home address to the server;
   retrieve public offices associated with the user's home address from the server and retrieve elected officials associated with those public offices;

obtain a list of pending pieces of legislation that the user's elected officials may vote upon from the server;

display a home screen to the user, the home screen including the list of pending pieces of legislation;

in response to the user selecting one of the pending pieces of legislation from the list of pending pieces of legislation to thereby designate a selected pending piece of legislation, retrieve a factual summary of the selected pending piece of legislation together with arguments in favor of and against the selected pending piece of legislation from the server and displaying the factual summary and arguments to the user;

receive user input indicating whether the user is in favor of or against the selected pending piece of legislation;

build a user profile based upon the user input;

retrieve from the server a list of elected officials for the public offices associated with the user's home address who are responsible for the selected pending piece of legislation;

display to the user options to call, e-mail, or contact the elected official via social media; for each action option, display the list of elected officials with contact information to the user;

in response to user selection to call, e-mail, or contact the elected official via social media, generate an optional script and cause the user device to effectuate calling, e-mailing, or contacting the elected official via social media;

display to the user an option to crowdfund advocacy efforts by donating to a group advocating for the selected pending piece of legislation, if the user indicated they favor the selected pending piece of legislation;

display to the user an option to crowdfund advocacy efforts by donating to a group advocating against the selected pending piece of legislation, if the user indicated they are against the selected pending piece of legislation; and in response to user selection to crowdfund the advocacy efforts, cause the user device to effectuate a transfer of funds from an account associated with the user to the group advocating;

an elected official device comprising a communications interface for data communications with the server over the Internet, the elected official device further comprising non-volatile memory storing instructions that, when executed by a microprocessor within the elected official device, configure the elected official device to cooperate with the server to generate a tracking interface showing how many of the elected official's constituents have indicated that they are in favor of ones of the pending pieces of legislation from the list of pending pieces of legislation and how many of the elected official's constituents have indicated that they are against those ones of the pending pieces of legislation, and configure the elected official device to facilitate communication with constituents of the elected official.

2. The system of claim 1 wherein the microprocessor of each user device, when executing the instructions stored in the non-volatile memory, further configures the user device to:

retrieve from the server a list of candidates for the public offices associated with the user's home address;

identify for the user one or more of the list of candidates who most closely match the user's profile such that those candidates support a majority of legislation that the user is in favor of and oppose a majority of legislation that the user is against;

display the list of candidates to the user;

display for the user how each of the candidates aligns with their user profile;

receive user input indicating which of the candidates the user desires to support;

retrieve engagement options from the server for the candidates of the list that the user desires to support; and display the engagement options to the user.

3. The system of claim 2, wherein the microprocessor of each user device, when executing the instructions stored in the non-volatile memory, further configures the user device to:

retrieve contact options from the server for the candidates that the user desires to support;

display the contact options to the user;

receive user input indicating a desired one of the contact options; and take an action based upon the user input.

4. The system of claim 3, wherein taking the action comprises facilitating user donation to a campaign of a candidate for which the user indicated support.

5. The system of claim 3, wherein taking the action comprises facilitating user donation to an organization advocating for legislation supported by a candidate for which the user indicated support or to an organization advocating against legislation opposed by the candidate for which the user indicated support.

6. The system of claim 1, further comprising an advocacy organization device comprising a communications interface for data communications with the server over the Internet, the advocacy organization device further comprising non-volatile memory storing instructions that, when executed by a microprocessor within the advocacy organization device, configure the advocacy organization device to accept input indicating which ones of the pending pieces of legislation from the list of pending pieces of legislation the advocacy organization supports and accept advocacy organization input indicating which ones of the pending pieces of legislation from the list of pending pieces of legislation the advocacy organization opposes and communicate the advocacy organization input to the server such that when the engagement options displayed to the user include donation to the advocacy organization, the user device retrieves the advocacy organization input, displays it to the user, and facilitates receipt of donations from the user.

* * * * *